May 9, 1950 L. A. DOUGHTY 2,506,952
CLOSURE FOR STORAGE BATTERIES
Filed June 1, 1946 5 Sheets-Sheet 1
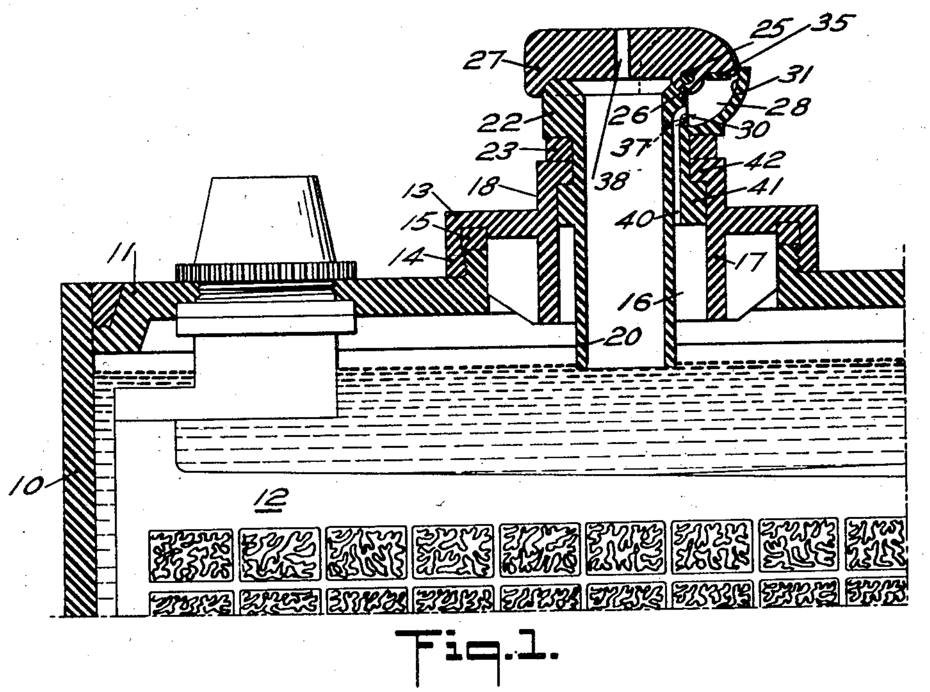
Fig.1.
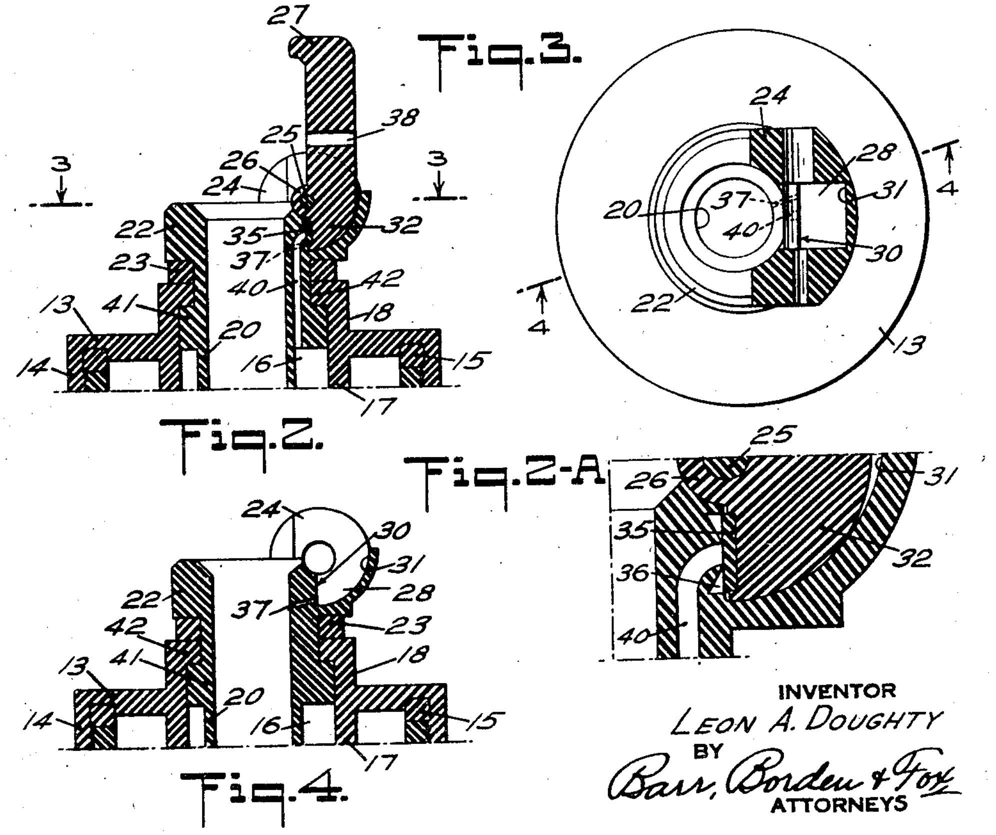
Fig.2. Fig.3. Fig.2-A Fig.4.
INVENTOR
LEON A. DOUGHTY
BY
Barr, Borden & Fox
ATTORNEYS INVENTOR
LEON A. DOUGHTY
BY
Barr, Borden & Foy
ATTORNEYS May 9, 1950 L. A. DOUGHTY 2,506,952

CLOSURE FOR STORAGE BATTERIES

Filed June 1, 1946 5 Sheets-Sheet 3

INVENTOR
LEON A. DOUGHTY
BY
Barr, Borden & Fox
ATTORNEYS

May 9, 1950 L. A. DOUGHTY 2,506,952

CLOSURE FOR STORAGE BATTERIES

Filed June 1, 1946 5 Sheets-Sheet 4

INVENTOR
LEON A. DOUGHTY
BY
Barr, Borden & Fox
ATTORNEYS

May 9, 1950 L. A. DOUGHTY 2,506,952

CLOSURE FOR STORAGE BATTERIES

Filed June 1, 1946 5 Sheets-Sheet 5

INVENTOR
LEON A. DOUGHTY
BY
Barr, Borden & Fox
ATTORNEYS

Patented May 9, 1950 2,506,952

UNITED STATES PATENT OFFICE 2,506,952

CLOSURE FOR STORAGE BATTERIES

Leon A. Doughty, Glenside, Pa., assignor, by mesne assignments, to C & D Batteries, Inc., Conshohocken, Pa., a corporation of Pennsylvania Application June 1, 1946, Serial No. 673,736

2 Claims. (Cl. 136—177)

The present invention relates to storage batteries and more particularly to a novel filling closure.

In present day storage batteries, the filling opening is closed by a removable cap provided with a vent for escape of gases. With such caps an attendant often forgets to replace the cap and it becomes lost and as a result of vibration of a battery on a train, or automobile, or other conveyance, causes the electrolyte to spill out so that its level in the battery is seriously lowered. Furthermore, since the batteries are usually in rather inaccessible locations, it is difficult to know when the desired liquid level has been reached, so that the battery is either scantily filled or filled to overflowing, both conditions being detrimental to the battery.

Some of the objects of the present invention are: to provide an improved closure for the filling opening of a storage battery; to provide a closure for gaining access to the battery without removing the closure; to provide a closure including novel means for venting the gases in a battery; to provide a closure wherein provision is made for preventing the battery being filled above a predetermined level; to provide a closure wherein provision is made for trapping air in the top of a battery so that a counterpressure is developed to resist a rise of the electrolyte above a predetermined level while filling; and to provide other improvements as will hereinafter appear.

Figure 5:
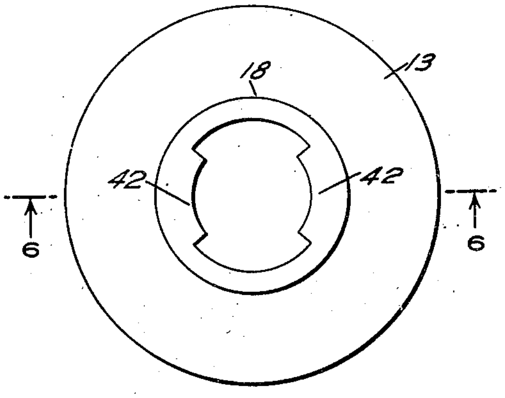
Figure 6:
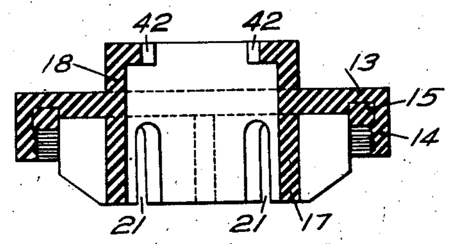
Figure 7:
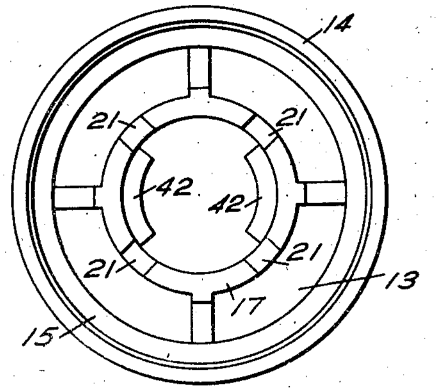
Figure 8:
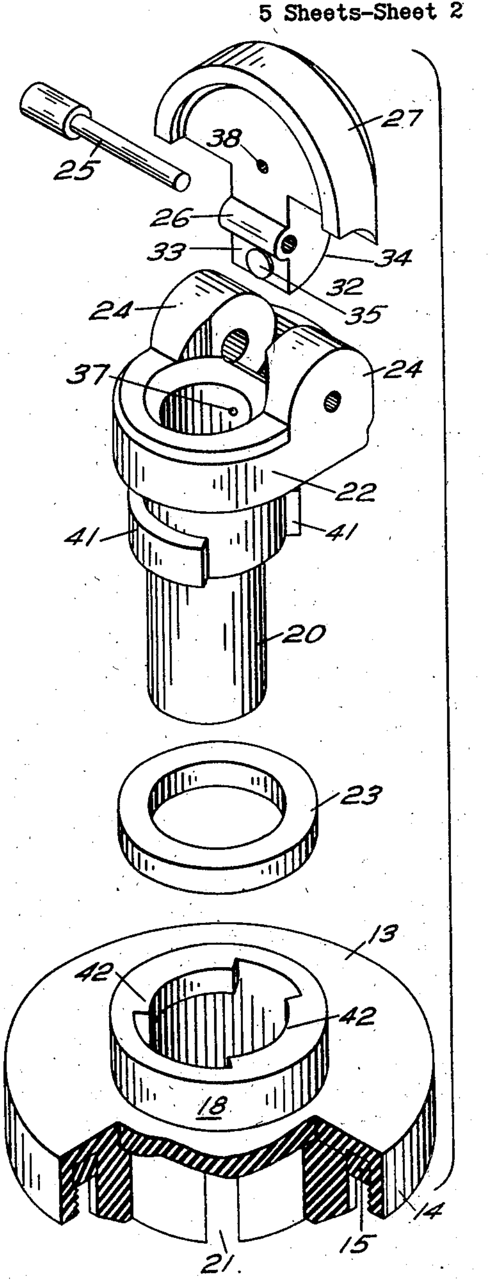
Figure 9:
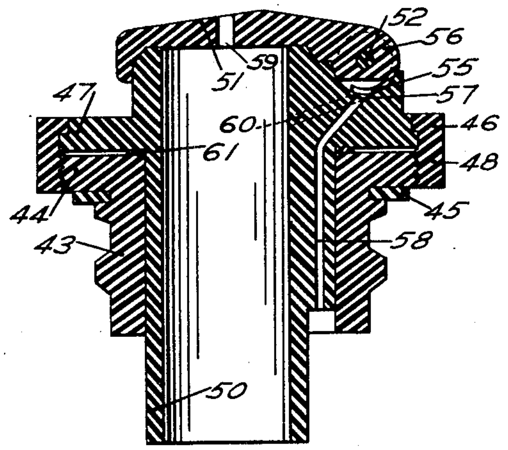
Figure 11:
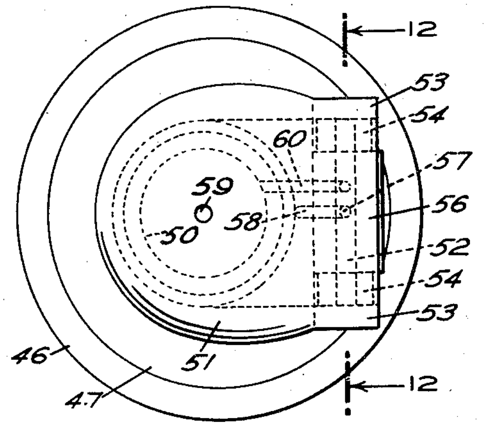
Figure 10:
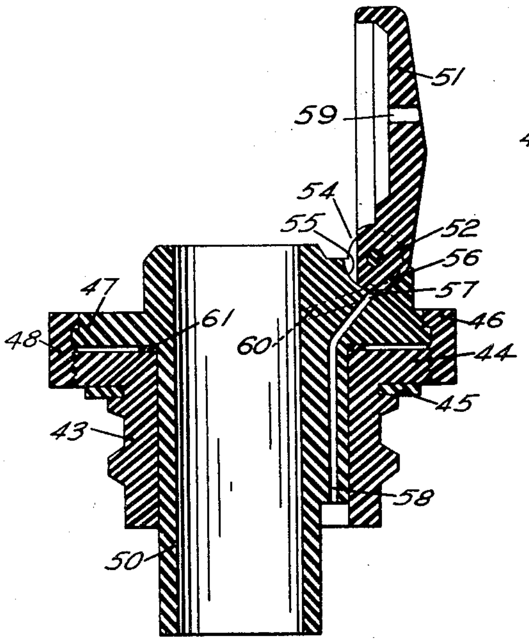
Figure 12:
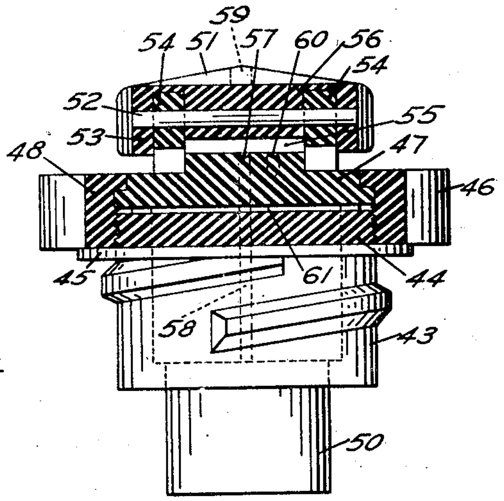
Figure 13:
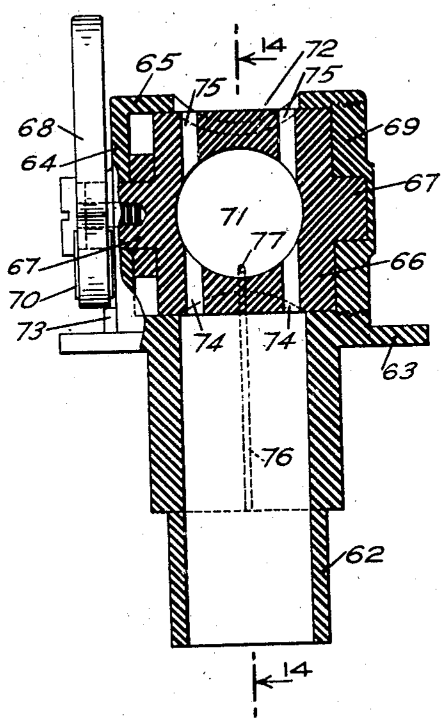
Figure 14:
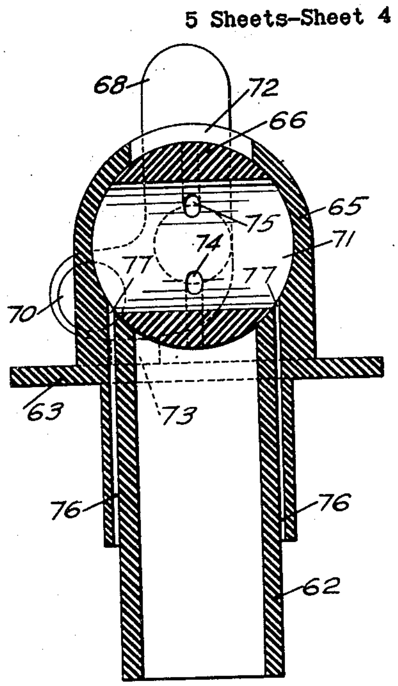
Figure 15:
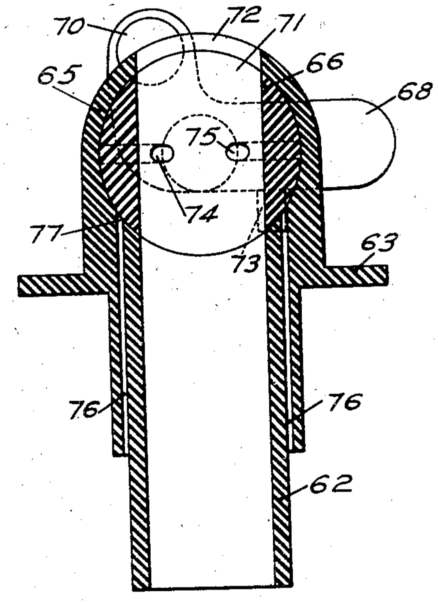
Figure 16:
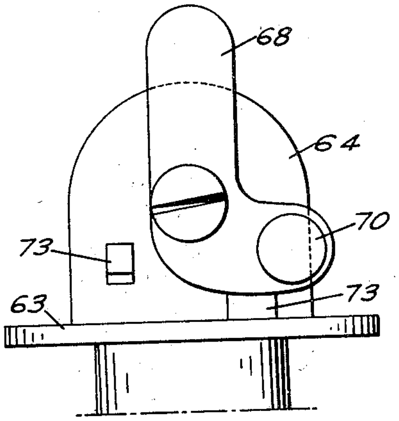
Figure 17:
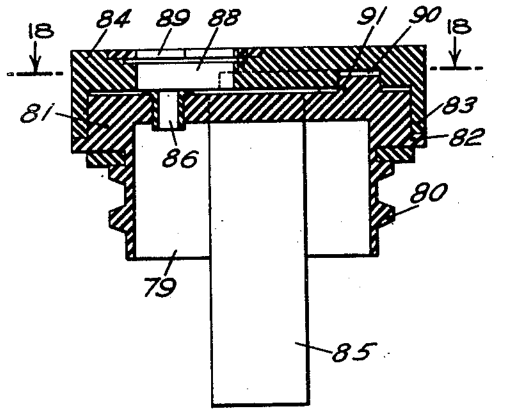
Figure 18:
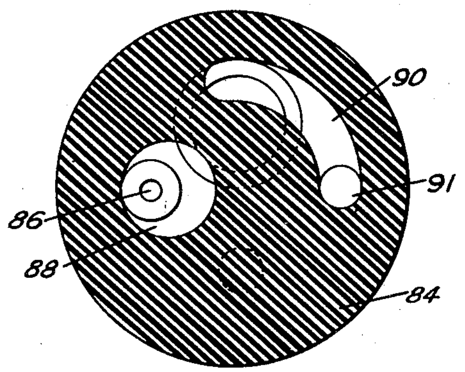
Figure 19:
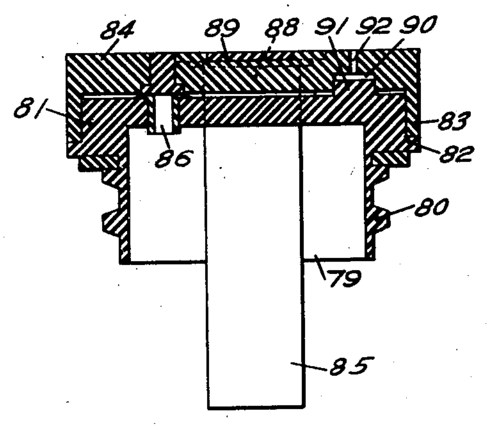
Figure 20:
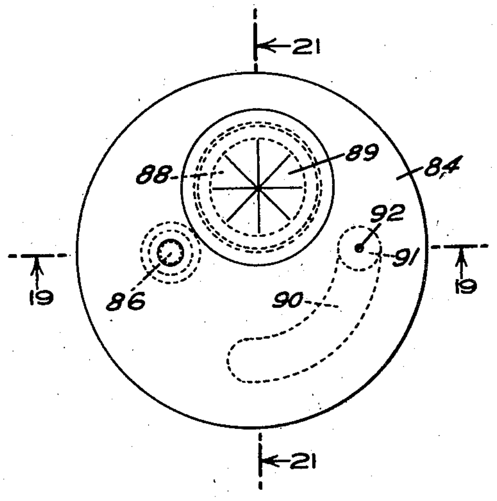
Figure 21:
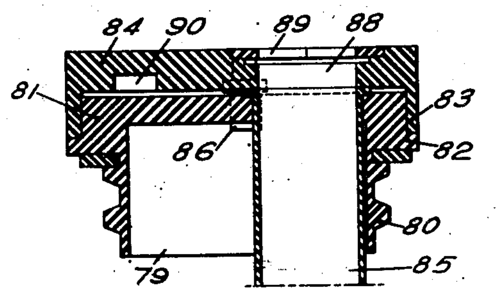

In the accompanying drawings, Fig. 1 represents a fragmentary sectional elevation of a storage battery showing one form of the present invention; Fig. 2 represents a fragmentary section of the closure showing the lid in filling position; Fig. 2-A represents a section on an enlarged scale showing the lid control vent valve; Fig. 3 represents a section on line 3—3 of Fig. 2; Fig. 4 represents a section on line 4—4 of Fig. 3; Fig. 5 represents a plan of the closure cap; Fig. 6 represents a section on line 6—6 of Fig. 5; Fig. 7 represents a bottom plan of the cap of Fig. 5; Fig. 8 represents an exploded perspective of the closure; Fig. 9 represents a sectional elevation of a modified form of the invention showing the lid in closed position; Fig. 10 represents a like section showing the lid open; Fig. 11 represents a plan of Fig. 9; Fig. 12 represents a section on line 12—12 of Fig. 11; Fig. 13 represents a sectional elevation of another form of the invention showing the control valve in closed position; Fig. 14 represents a section on line 14—14 of Fig. 13 showing the valve in closed position; Fig. 15 represents a section like Fig. 14 showing the valve open for filling; Fig. 16 represents a side elevation of the closure; Fig. 17 represents a sectional elevation of another modification of the invention showing the closure open for filling; Fig. 18 represents a section on line 18—18 of Fig. 17; Fig. 19 represents a section like Fig. 17 showing the closure in closed position; Fig. 20 represents a plan of the closure; and Fig. 21 represents a section on line 19—19 of Fig. 20.

Referring to Figs. 1 to 8, the preferred form of the invention is shown as assembled in operative condition as a closure for the filling opening of a storage battery of which the container 10, cover 11, and plate structure 12 are fragmentarily illustrated. In the present instance the closure comprises a cap 13 having an internally threaded circumferential flange 14 for securing the closure about the externally threaded neck of the filling opening of the battery, where it seats in leakproof relation through the medium of a gasket 15 located in a groove of the cap body 13. This body 13 is formed with an inwardly disposed annular flange 17 and an axially outwardly disposed annular hub 18, these two parts, plus the thickness of the body 13, forming a through opening 16 to receive a filling tube 20. The flange 17 is preferably provided with spaced slots 21 which serve to direct gases into the space encircling the filling tube 20. It should be noted that the length of the tube 20 is such that when in assembled condition its lower end terminates at or just below the normal level of the electrolyte in the battery or cell.

For mounting the filling tube 20 on the closure, it is provided with an annular head 22 so dimensioned as to seat upon the hub 18 and seal the joint therebetween through the medium of an interposed gasket 23. The head 22 is provided with two upstanding apertured bosses 24 which serve to mount a transversely disposed fixed bearing pin 25 which passes through a bearing boss 26 formed upon a closure lid 27 by means of which access is had, when open, to the filling tube, and when closed, seals the ends of the filling tube. That portion of the head 22 between the two bosses 24 is cut away to provide a depressed well 28 bounded on two opposite sides by the bosses 24 and on the other two opposite sides respectively by an inner wall 30 and an outer curved wall 31. This well 28 is shaped to receive an extension tongue 32 of the lid 27, this tongue 32 having a flat face 33 and a curved face 34 generated about the bearing boss 26 as an axis. The face 33 is arranged to abut the wall 30 of the head 22 when the lid is open and carries a valve 35 to seal a cone shaped vent outlet 36 formed in the aforesaid face 33. A vent passage 37 leads from the well 28 to the interior of the tube 20, to allow gas to escape from the well 28, by way of the tube 20 to the atmosphere through a vent 38 provided in the closure lid 27. This passage 37 also acts as a means to allow any condensation which collects in the well 28 to drain back into the battery through the tube 20.

In order to vent the space between the battery cover and the liquid level in the battery, a vent passage 40 parallels the outside of the tube 20 and is of such a length as to form a communication between the aforesaid space and the vent outlet 36. Thus, with the lid closed, the vent outlet valve 35 is open and escaping gases in relatively minute quantities can leave the battery through the passage 40 and escape to the atmosphere by way of the well 28, vent 37, tube 20, and vent 38. This vent passage 40 also functions to cut off communication between the battery space and the atmosphere when the lid 27 is open, because then the valve 35 seats upon the outlet 36. As a result, the trapped air in the battery space prevents the filling water from rising above a predetermined level so that correct filling is ensured.

For locking the filling tube head 22 in sealed relation upon the hub 18, the tube 20 is provided with two oppositely disposed arcuate flanges 41 which are arranged to enter the hub 18 between two oppositely disposed arcuate ribs 42 formed on the inner wall of the bore of the hub 18. The upper faces of the two flanges 41 are circumferentially inclined upwardly so that after the filling tube 20 is in place and the flanges 41 just below the ribs 42, then a quarter turn of the head 22 will bring the ribs 42 below the flanges 41 to thus clamp the parts in sealing position. This construction can be followed by reference to Fig. 8.

It should be noted that the lid 27 has its weight so distributed with respect to the pivot or shaft 25 as to make it self-closing by gravity and, hence, the filling opening cannot be left open due to carelessness of the attendant. Also, when closed, vibration or tilting of the battery cannot cause an overflow by reason of the length of the filling tube which deflects any moving liquid angularly from side to side of the tube so that it does not reach exteriorly of the battery.

In the form of the invention shown in Figs. 9 to 12, the filling opening closure comprises an annular base 43 suitably threaded at one portion for entering the filling opening of the battery and having the other portion in the form of a flange 44 against which a gasket 45 seats to form a leakproof joint with the cover of the battery. The periphery of the flange 44 is threaded in order to be engaged by an internally threaded clamping annular collar 46 by which the filling tube member is held in assembled condition.

The filling member comprises a stepped disc 47 of such diameter as to fit snugly within the collar 46, with its stepped circumferential part abutting an internal circumferential flange 48 on the collar 46. A filling tube 50 is carried coaxially of the disc 47 and has a length sufficient to bring its inner end at or below the level of the electrolyte. The outer end of the tube 50 protrudes through the disc 47 sufficiently to allow for proper closing action of a closure lid 51. The inner face of the lid 51 is internally depressed and chamfered for complemental seating on the chamfered end of the tube 50. The lid 51 is hinged to the disc 47 by a pivot pin 52 passing through apertured ears 53 and 54 formed respectively on the lid 51 and on the disc 47. Between the ears 54 the lid 51 is formed with an arcuate well 55 to receive an arcuate extension 56 of the lid 51, such extension in open position of the lid 51 functioning as a ground valve to close a vent 57.

In order to permit gases above the liquid level of the battery to reach the vent 57, the latter forms the outlet from a passage 58 having a length sufficient to bring its inlet into the space above the liquid level. As shown, the passage 58 parallels the tube 50 on the outside thereof and thus lies between the tube 50 and the inner periphery of the base 43. While this passage 58 serves to allow collected gas to escape, it also functions, when closed by the valve extension 56, to cut off atmospheric pressure and thus automatically regulate the level of the liquid during a filling operation.

A vent passage 60 leads from the well 55 to the interior of the tube 50, to allow gas to escape from the well 55, by way of the tube 50, to the atmosphere through a vent 59 provided in the closure lid 51 when the lid is closed. When the lid 51 is open the valve extension 56 closes both the passage 60 and the vent 58 so that no venting to the atmosphere takes place and the space above the battery plates becomes air bound when the level of the liquid seals the outlet of the tube 50. This passage 60 also acts as a means to allow any condensation which collects in the well 55 to drain back into the battery through the tube 50.

As a means of preventing leakage about the joint between the disc 47 and the collar 46, a gasket 61 is provided, which fits about the tube 50, and can be compressed.

Another modification of the invention is shown in Figs. 13 to 16. The filling tube 62 carries an enlarged disc 63 which mounts the spaced heads 64 of a cylinder 65, having a horizontal axis. The cylinder 65 is arranged to receive a cylindrical valve plug 66 having trunnions 67 riding in the bearings provided by the respective heads 64. One trunnion 67 projects from its head 64 to mount a bell crank lever 68 by which the plug 66 can be rocked from open to closed position and vice versa. Preferably, the lever 68 carries a counter-weight 70 which functions to automatically return the valve plug to closed position. A through bore 71 is provided in the valve plug 66 for coaxial alinement with the filling tube 62, and inlet opening 72 in the top of the cylinder 65, so that in open position of the plug 66, filling water can be poured through the opening 72 and bore 71 into the battery, while the valve plug is manually held open through the medium of the lever 68. When the lever 68 is released, the weight 70 automatically swings the valve plug 66 to closed position. Stops 73 are properly located on the head 64 to limit the swing of the lever 68 in both of its positions.

In order to provide an escape of gas by way of the filling tube 62, two vent passages 74 pass through the one end of the plug 66 to form communications with the bore 71. These passages 74 are located to establish communication between the filling tube 62 and the bore 71 in closed position of the valve plug 66. Also, two like passages 75 pass through the other end of the plug 66 at the opposite side of the bore 71 from the passages 74 and likewise form communications with the bore 71. These passages 75 are also located in the plane of the axis of the filling tube 62 in closed position of the valve plug 66. While it is preferred to have the two pairs of passages 74 and 75 located as described, these may be otherwise arranged so long as one pair 74 forms a communication between the filling tube 62 and the bore 71, and the other pair at the same time forms a communication between the bore 71 and the opening 72, when the valve plug 66 is in closed or non-filling position.

For the purpose of allowing gases to escape from the space above the liquid level in the battery, two restricted vent passages 76 are provided along the outside of the tube 62 and extend from the said space to discharge outlets 77 in the cylinder encloser 65, so located that in closed position of the valve plug 66 each outlet will communicate with the bore 71. Thus, when the valve plug 66 is closed, the vent passages 76 deliver the gases to the bore 71 for final discharge through the pair of vent passages 75 to the atmosphere, thereby allowing gases in the battery above the inlet to the filling tube to escape. At the same time, any gases entering the filling tube will discharge into the bore 71, by way of the passages 74, and thence to the atmosphere by way of the passages 75.

It should be particularly noted when the valve plug 66 is open that the snug fit of the plug 66 in the cylinder 65 causes the outlets 77 to be sealed to thereby cut off atmosphere pressure to the space above the liquid level in the battery. In consequence, during a filling operation the water entering the battery can only rise to a level where the pressure of the trapped air above and surrounding the filling tube inlet resists further rise. When this occurs the filling tube will overflow as an indication that the proper electrolyte level has been reached. The valve plug 66 is now allowed to close and the small amount of water in the valve bore 71 discharges into the battery but practically causes no appreciable rise of the predetermined level.

A further modification of the invention is shown in Figs. 17 to 21, wherein the filling closure comprises a threaded annular neck 80 for attachment in the filling opening of a battery, the upper end of which neck is formed as a cylindrical base 81 having a circumferential flange 82 for seating the annular bottom 83 of a superposed cap cover 84. Mounted in the base 81 and eccentric to the axis of the neck 80 is the filling tube 85 of the required length to properly terminate with respect to the desired liquid level. A vent port 86 is formed in the base 81 to form a communication between the chamber 79 formed between the neck 80 and the filling tube 85.

For filling purposes the cover 84 has an inlet 88 preferably of the same diameter as the filling tube 85, and having the same eccentricity with respect to the axis of the neck 80 as does the filling tube 85, so that in filling position of the cap cover 84 relative to the neck 80, the inlet 88 is in register with the filling tube 85. This outlet 88 is preferably closed by a resilient centrally slitted diaphragm 89 serving in filling position of the tube to allow water to be poured therethrough, or for the insertion of a hydrometer.

In order to limit the turning of the cap cover 84 to assure proper relation between it and the neck 80, the inner face of the cover 84 is provided with an arcuate groove 90, of a width and depth to receive a stop pin 91 mounted on the base 81 on a radius corresponding to the radius of the groove 90 and so positioned that when the cover 84 is in position for filling, the inlet 88 is in register with the filling tube 85, and when the cap cover is turned to the non-filling position, the inlet 88 is in register with the port 86 while the filling tube 85 is in register with a vent 92 leading from the groove 90 to the atmosphere. The length of the groove 90 is such that its ends form stops respectively for assuring correct registration of the vents in both positions of the cover.

It will now be apparent that a new and novel filling cap for the filling opening of a storage battery has been devised wherein the cap becomes an attached part of the battery and cannot be displaced by vibration and become lost. Furthermore, it is self-sealing so that the filling opening cannot be left open carelessly to allow the electrolyte to be splashed out. Also, provision is made for filling the battery only to a predetermined level due to a novel vent arranged to be closed when filling the battery so that the space above the electrolyte becomes air bound to cause the filling opening to overflow when the proper level is nearly reached. When this occurs, the neck of the cap contains a measured quantity of water which, when released by closing the cap lid, flows by gravity into the battery and establishes the desired predetermined level.

Having thus described my invention, I claim:

1. In a storage battery, a filling and venting unit comprising a filling tube having a filling passage, an open well at one side of the top of said tube and a relief vent leading from the battery space into said well, means to mount said tube in a filling opening of the battery with its outlet at approximately the required liquid level in the battery, a lid pivotally mounted to open and close said filling passage and having a vent communicating with said passage in closed position of said lid, and an extension tongue on said lid to ride in said well as a control valve for said space relief vent, said valve operating to open said relief vent in closed position of said lid and to close said relief vent in open position of said lid, whereby the battery space around said tube is air bound when the incoming liquid seals the outlet of said filling tube.

2. In a storage battery, a filling and venting unit comprising a filling tube having a filling passage, an open well at one side of the top of said tube and two relief vents leading respectively from the battery space and said passage to said well, means to mount said tube in a filling opening of the battery with its outlet at approximately the required liquid level in the battery, a lid pivotally mounted to open and close said filling passage and having a vent communicating with said passage in closed position of said lid, and an extension tongue on said lid to ride in said well as a valve controlling both relief vents, whereby the battery space around said tube is air bound when the incoming liquid seals the outlet of said filling tube.

LEON A. DOUGHTY.

REFERENCES CITED

The following references are of record in the file of this patent:

UNITED STATES PATENTS

| Number | Name | Date |
|---|---|---|
| 1,163,992 | Ford | Dec. 14, 1915 |
| 1,269,096 | Land | June 11, 1918 |
| 2,220,005 | Smith | Oct. 29, 1940 |
| 2,298,789 | Hill et al. | Oct. 13, 1942 |
| 2,346,937 | Olson | Apr. 18, 1944 |